United States Patent Office 3,825,625
Patented July 23, 1974

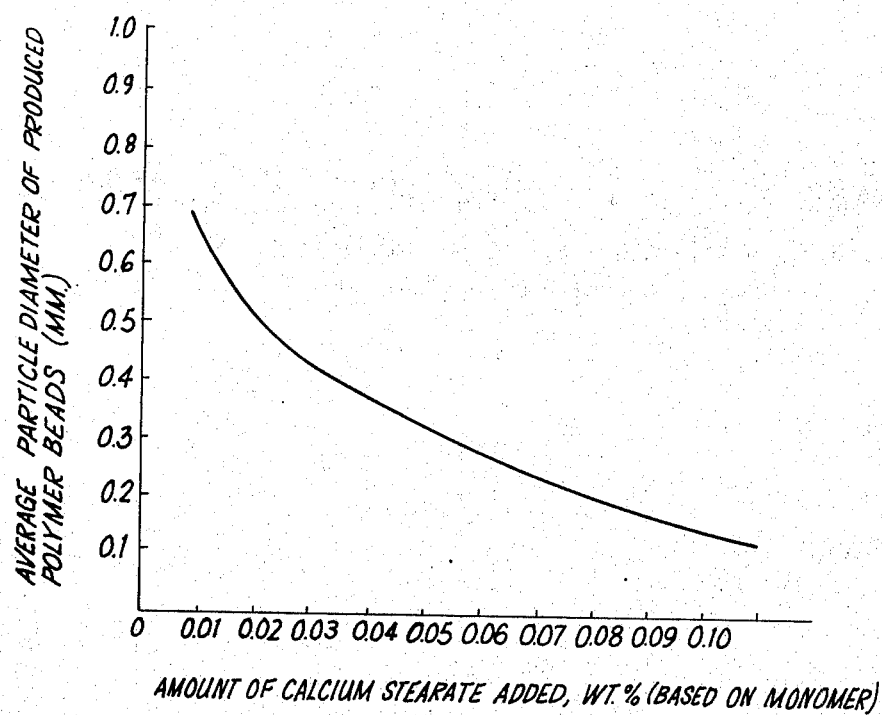

---

3,825,625
PROCESS FOR PRODUCING HIGH IMPACT RESISTANCE RESINS
Teizo Kudo, Ohimachi, and Saizo Ikeda, Yuzo Sonoyama, and Motoharu Kotani, Sakai, Japan, assignors to Daicel Ltd., Osaka, Japan
Filed Dec. 27, 1971, Ser. No. 212,616
Claims priority, application Japan, Dec. 30, 1970, 46/122,234
Int. Cl. C08f 1/04, 1/11, 19/08
U.S. Cl. 260—880 R          6 Claims

ABSTRACT OF THE DISCLOSURE

Pearl-like spherical thermoplastic resin beads having a high impact resistance and of a controlled relatively small particle size are made by subjecting a mixture or a solution of a rubber elastomer in an aromatic monoalkenyl monomer or a mixture of an aromatic monoalkenyl monomer and a copolymerizable monovinyl monomer to a bulk-suspension two stage polymerization process. A predetermined amount of a metallic soap or an alkylene bis fatty acid amide is added to the mixture or solution before the start of the bulk polymerization in an amount within the range of 0.001 to 0.5% by weight.

---

The present invention relates to an improved process for preparing rubber-modified resins having high impact resistance, particularly rubber-modified polystyrene resins and ABS resins, by a bulk-suspension two stage polymerization process consisting of a preliminary bulk polymerization and a subsequent suspension polymerization. More particularly, the present invention relates to a novel and improved bulk-suspension polymerization process for controlling easily the average particle size of pearl-like beads of the high impact resins to be obtained, in which resin a vinyl monomer or vinyl monomer mixtures mainly consisting of at least one aromatic monoalkenyl monomer are combined with a rubber elastomer.

The most important point in a bulk-suspension polymerization process for preparing high impact rubber-modified resins resides in how a viscous reaction product containing polymers produced by the preliminary bulk polymerization could be mtaintained in a stable aqueous suspension state and the final product could be obtained in the form of pearl-like beads of a desired size.

The value of a bulk-suspension polymerization process will be determined according to how pearl-like beads are produced by the process with a preferable average diameter. When the resulting beads have, for example, an oval or flat shape, not a pearl-like shape, this will cause various troubles on the transportation of these beads in a slurry state. Further, in case the particle size of said beads is too large, the removal of volatile substances remaining in said beads will be difficult and, as a result, a long time will be required in the drying process, which will badly affect the thermal deformation temperature of the product, etc. On the other hand, in case the particle size of said beads is excessively small, various troubles may appear in the process for washing and drying the beads, which may cause a reduction of the yield of the product and a lowering of the qualities of the product due to contamination by impurities, and thus the advantages of the suspension polymerization process may be impaired.

Further, there is a preferable range of the particle size of polymer beads for rotational molding, by which said beads are directly molded, and, therefore, it is very important to control the particle diameter of the resulting polymer beads to a desired size.

However, it has been recognized that, in the production of high impact resins having an aromatic monoalkenyl monomer as a major component, on an industrial scale under conventional reaction conditions of suspension polymerization, it often is difficult to vary said particle diameter of the restulting polymer beads properly.

As a means for controlling the particle size of the produced polymer beads under conventional reaction conditions of suspension polymerization there have been used the selection of the kinds of suspending agents, the amounts thereof and the agitation velocity. In order to increase the particle size, there will be employed generally such means as reducing the agitation velocity or decreasing the amount of said dispersing agent. However, in case these means are employed, the suspension will become unstable and the suspended particles may be gathered into blocks, that is to say, there will be the danger of agglomeration. On the other hand, in order to reduce the particle size, the agitation velocity should be increased or the amount of the dispersing agent should be increased. However, in these cases, the agitation velocity can not be freely increased because of mechanical limitations and the increasing of the amount of the dispersing agent is not economically practical. An anionic surface active agent is often simultaneously used as an assistant for said suspending agent. It will be possible to reduce the particle size of said produced polymer beads by the use of said surface active agent in an excessive amount more than is conventional, but, in such a case, an emulsion polymerization may simultaneously occur during the course of said suspension polymerization and very fine particles would be by-produced in a large amount, and also the resulting polymer beads are often not pearl-like but are changed to such a shape as that of an oval, etc., which will be due to the decrease of surface tension of water. Further, a large amount of foam may be produced during the course of said suspension polymerization reaction or during the treatment of the produced slurry and this may cause various troubles.

Further, it has been known that, when a large amount of surface active agent is used, a stable suspended state may not often be maintained and there will be a great danger of agglomeration.

Generally, as the viscosity of the solution to be dispersed is increased, the diameter of the dispersed oil droplets is increased. In a bulk-suspension polymerization process, a viscous solution containing polymers produced by the bulk-polymerization must be suspended, so that there is a tendency that the resulting polymer particles will become excessively large.

As described above, there has not yet been developed a process for preparing a high impact resin in the form of beads which are beautiful in appearance and have a desirable particle size through a bulk-suspension polymerization process.

We have studied the method for controlling the particle size of polymer beads to be produced in a bulk-suspension polymerization process for producing a high impact rubber-modified resin and accomplished the present invention.

Accordingly, an object of the present invention is to provide a novel method for preparing pearl-like polymer beads of a rubber-modified resin having a high impact strength and a desired particle size, by a bulk-suspension polymerization process.

The present invention provides a novel process of preparing a high impact resin in beautiful pearl-like beads by adding a certain kind of lubricant for plastic to a solution or mixture which has been prepared by dissolving or mixing a rubber elastomer in an aromatic monoalkenyl monomer or a mixture of an aromatic monoalkenyl monomer and a copolymerizable monovinyl monomer and further adding conventional radical polymerization catalysts such as organic peroxides and azo compounds and molecular weight regulators such as mercaptans etc., if necessary, then subjecting the solution or mixture thus formed to a preliminary bulk polymerization step until the conversion of the monomer or monomer mixture to the polymer reaches 10 to 45% by weight, suspending the resulting viscous solution containing the bulk-polymerized polymers in an aqueous medium which contains a suspending agent and conducting an aqueous suspension polymerization of the resulting suspension until the polymerization is substantially completed, thereby obtaining the product polymer in the form of beautiful pearl-like beads. According to the process of the present invention, beautiful pearl-like beads can be obtained much easier than by a known suspension polymerization procedure without impairing the properties of the produced polymer and also the particle size of the polymer beads may be easily controlled.

In other words, the present invention provides a bulk-suspension polymerization process, which is characterised in that a specifically selected lubricant for plastic is added to a monomer solution or mixture in which a rubber elastomer has been dissolved or admixed and which should be subjected to a preliminary bulk polymerization, for the purpose of varying the particle size of the suspended beads of the produced polymer in said bulk-suspension polymerization procedure. Said monomer solution or mixture, to which said lubricant has been added, will be partially polymerized by the preliminary bulk polymerization and then the system will be subjected to a suspension polymerization. The finally produced polymer beads can be obtained in an average particle size (median size according to Rosin-Rammler's formula: $R=100 \exp(-bx^n)$, wherein R=percent by weight on the sieve, $x$: particle size, $b$, $n$ are constants. Refer to P. Rosin, E. Rammler, J. Inst. Fuel., 7, 29 (1923)) in the range of 3 mm. to 0.1 mm. and which can be easily adjusted within said range. Said polymer beads have a beautiful peal-like appearance. Such fine particles which might be formed if an emulsion polymerization were to occur simultaneously with said suspension polymerization, are not substantially by-produced.

As the aromatic monoalkenyl monomer to be used in the method of the present invention, styrene is the most preferable, but α-methyl styrene and various nuclear substituted styrenes may be used and mixtures of styrene with such substituted styrenes may be also used. The copolymerizable monovinyl monomer which can be optionally used in mixture with said aromatic monoalkenyl monomer is exemplified by acrylonitrile, acrylic acid esters or methacrylic acid ester, such as methyl, ethyl and butyl esters, but it is not limited to these compounds and may be any one or more of polymerizable compounds containing an ethylenic

group.

The elastomer to be mixed in the styrenic monomer or monomer mixture prior to the preliminary bulk polymerization step in the method of the present invention may be one of such elastomers as generally have been used in the production of impact resistant rubber-modified resins, preferably synthetic rubbers derived from butadiene or chloroprene as a predominant constituent. Particularly, such rubbers as polybutadienes and butadiene-styrene copolymers having a relatively high stereoregularity prepared in solution polymerization by using a catalyst containing lithium as the major component can give good results.

As the particle size regulating agent for regulating the particle size of the suspended beads of the final product, a specifically selected lubricant for plastic is used in the process of this invention, which lubricant is a metallic soap such as calcium stearate or calcium laurate, etc., or an alkylene bis fatty acid amide such as methylene bis stearoamide or ethylene bis stearoamide, etc., and mixtures thereof. Among lubricants which have been generally used, the aforesaid lubricants are particularly effective in the process of the present invention for the reason as described hereinafter. However, among lubricants which have been generally used, paraffin wax (M.P. 40 to 60° C.), for example, do not have any action for regulating the particle size of the copolymer beads. As metallic soaps, metallic salts of a fatty acid such as stearic acid, palmitic acid, oleic acid, ricinoleic acid, lauric acid, etc. and a metal such as calcium, magnesium, aluminum, barium, zinc, lead, cadmium, etc. may be used.

Further, it is surprising that these particle size regulating agents should be added to a solution of a rubber elastomer in a vinyl monomer prior to the preliminary bulk-polymerization. The aforesaid particle size regulating agents do not show any effects of varying the particle size of the beads when they are added to the polymerization mixture just before the completion of the preliminary bulk-polymerization or to the aqueous media containing said suspending agent, and in some cases, a stable suspension can not be obtained, and the beads of the polymerization reaction product are sometimes agglomerated to blocks. This reaction is not clear, but it is presumed that said particle size regulating agent is probably adsorbed only on the suspending agent and it gives undesirable influences on the dispersibility of the suspending agent and the wettability of solid-liquid.

The amount of the above mentioned particle size regulating agent to be used in the present invention is 0.001 to 0.5% by weight, preferably 0.01 to 0.2% by weight, based on the weight of the monomer containing said rubber elastomer.

At the suspension polymerization stage fine particles of magnesium hydroxide, are used. Further, as an assistant for said suspending agent there can be of course added known anionic surface active agents.

In the polymerization process of the present invention, there is no limitation on the kinds of polymerization catalysts to be used and conventional radical polymerization catalysts such as organic peroxides or azo compounds may be used. The polymerization temperature is not particularly different from the ones conventionally used in prior art processes and may be generally between 50 and 150° C., preferably between 70 and 120° C.

There is of course no problem in adding an appropriate additive such as a molecular weight regulator and a plasticizer, etc. to the polymerization reaction system.

The process will now be explained by the following nonlimiting examples.

All the following references to "parts" shall mean parts by weight.

EXAMPLE 1

Into a 120 liter reaction kettle equipped with a strong agitation mechanism, a rubber dissolved solution of the following recipe was charged:

| | Parts |
|---|---|
| Styrene | 28 |
| Acrylonitrile | 72 |
| Styrene-butadiene rubber (styrene content: 25% by weight)* | 15 |
| Dibenzoylperoxide | 0.15 |
| Dicumylperoxide | 0.10 |
| Tertiary dodecyl mercaptan | 0.33 |
| Calcium stearate | 0.1 |
| Butylbenzyl phthalate | 3 |
| Water | 20 |

*"Tufdene 2000A" (Trademark), manufactured by Asahi Chemical Industry Co., Ltd., Japan.

After substitution of air in the kettle with nitrogen, bulk polymerization was conducted at the number of revolutions of 600 r.p.m., at 73° C. for 3.5 hours. The reaction mixture obtained by the above preliminary bulk polymerization was then transferred into pressure reaction vessel (250 liter volume) equipped with an anchor-shaped stirrer which was previously charged with a liquid having 4.5 parts of magnesium hydroxide suspended in 80 parts of water. After the internal atmosphere of the pressure reaction vessel was substituted with nitrogen, suspension polymerization was conducted with stirring at 120 r.p.m. at 120° C. for 5 hours, thereby completing the polymerization reaction. After cooling, hydrochloric acid was added to dissolve and remove magnesium hydroxide. Then the mixture was sufficiently washed with water in a basket-type centrifugal hydroextractor, filtered and dried to obtain pearl-like polymer beads.

This polymer was peleltized on a small extruder and injection molded into test pieces at 240° C. The mechanical properties of the test pieces were measured.

EXAMPLE 2

A polymer was prepared by the same recipe in Example 1 and by following the same procedure as described in Example 1 except that the amount of calcium stearate was changed to 0.01 part.

COMPARATIVE EXAMPLE 1

In the same recipe as described in Example 1, calcium stearate was not added to the reaction system prior to the start of polymerization, but it was added to the reaction system immediately before the completion of the preliminary bulk polymerization stage, i.e. at the time when the bulk polymerization had proceeded by heating at 73° C. for 3 hours and 20 minutes and thereafter the bulk polymerization was continued at 73° C. for 10 minutes and then the reaction mixture was transferred to the suspension polymerization. Except the above changes, the procedure was the same as in Example 1.

COMPARATIVE EXAMPLE 2

In the same recipe as described in Example 1, calcium stearate was not added to the solution of the styrene-butadiene rubber (Tufdene 2000A) in the styrene-acrylonitrile monomer mixture but to the aqueous medium containing magnesium hydroxide. Except these changes, the procedure was the same as in Example 1.

COMPARATIVE EXAMPLE 3

In the same recipe as described in Example 1, calcium stearate was not used at all. Except for this the procedure was the same as the procedure in Example 1. The resulting polymer was pelletized on a small extruder and test pieces were prepared by means of an injection molding machine, and mechanical properties of these test pieces were measured.

The properties of the above five kinds of polymer beads are summarized in the following Table 1.

TABLE 1

| | Median size from Rosin-Rammlers's formula, m./m. | Appearance of particles | Amount of fine particles (which passed through 200 mesh filter cloth) |
|---|---|---|---|
| Example 1 | 0.15 | Pearl-like | Substantially none. |
| Example 2 | 0.66 | do | Do. |
| Comparative example 1 | 1.08 | do | Do. |
| Comparative example 2 | 1.15 | Containing some oval particles. | Some amount contained. |
| Comparative example 3 | 1.21 | Pearl-like | Do. |

As will be seen in Table 1, it is noted that the polymer beads in Examples 1 and 2 are controlled to small particle sizes.

Further, polymers in Example 1 and Comparative Example 3 were compared with respect to their mechanical properties, which were as shown in the following Table 2.

TABLE 2

| | Melt viscosity at 240° C. (poise×10⁻³) | Tensile strength (kg./cm.²) | Izod impact strength (kg.cm./cm.) | Surface reflectivity (percent) |
|---|---|---|---|---|
| Example 1 | 10 | 449 | 15.0 | 91 |
| Comparative example 3 | 10 | 448 | 14.8 | 90 |

As will be understood from the results in Table 2, it is noted that the mechanical characteristics of the polymer produced in Example 1 were not impaired by the addition of calcium stearate at all, compared with the polymer without calcium stearate.

In the drawing:

The attached single figure shows an example of the relationship between the amount of calcium stearate added and the average particle diameter of the produced polymer beads according to the process of the present invention.

That is to say, when the polymerization was conducted by following said Examples 1 and 2 except the amount of calcium stearate was varied, the results as shown in the attached figure were obtained. It will be understood from the figure that a polymer in the form of beads having a desired size can be produced by varying the amount of calcium stearate to be added.

EXAMPLE 3

Except magnesium stearate was used instead of calcium stearate in the recipe of Example 1, the same procedure as in Example 1 was followed to produce a polymer.

EXAMPLE 4

Except cadmium ricinolate was used instead of calcium stearate in the recipe of Example 1, the same procedure as in Example 1 was followed to produce a polymer.

EXAMPLE 5

The results of Examples 3, 4 and 5 were compared with the one of Comparative Example 3 as shown in the following Table 3.

TABLE 3

| | Median size from Rosin-Rammler's formula, m./m. | Appearance of particles | Amount of fine particles |
|---|---|---|---|
| Example 3 | 0.16 | Pearl-like | Substantially none. |
| Example 4 | 0.17 | do | Do. |
| Example 5 | 0.13 | do | Do. |
| Comparative example 3 | 1.21 | do | Some amount contained. |

As will be seen in Table 3, it is noted that polymer beads of Examples 3, 4 and 5 are controlled to small particle sizes.

EXAMPLE 6

Except an alkylene bis-fatty acid amide lubricant (Trademark: VLA-1 produced by Kawaken Fine Chemical Co.) was used instead of calcium stearate in the recipe of Example 1, the same procedure as in Example 1 was followed to produce a polymer.

COMPARATIVE EXAMPLE 4

Except sdoium lauryl sulfate (Trademark: Monogen produced by Daiichi Kogyo Seiyaku Co.) was used instead of calcium stearate in the recipe of Comparative Example 2, the same procedure as in Comparative Example 2 was followed to produce a polymer. However, in the course of the suspension polymerization, the agglomeration of dispersed particles occurred at the time when the polymerization was conducted by heating at 120° C. for about one hour.

COMPARATIVE EXAMPLE 5

Except the amount of the Monogen (sodium lauryl sulfate) was changed to 0.01 parts in the recipe of the Comparative Example 4, the same procedure as in Comparative Example 4 was followed to produce a polymer.

The polymer beads produced in Example 6, Comparative Examples 5 and 3 were compared and the results were as shown in the following Table 4.

TABLE 4

| | Median size from Rosin-Rammler's formula, m./m. | Appearance of particles | Amount of fine particles |
|---|---|---|---|
| Example 6 | 0.18 | Pearl-like | Substantially none. |
| Comparative example 5 | 0.80 | Flat and oval | More than 5%. |
| Comparative example 3 | 1.21 | Pearl-like | Substantially none. |

As understood from the results of Table 4, it is noted that the polymer beads of Example 6 are controlled to be of a small size.

EXAMPLE 7

Into a 120 liter reaction kettle equipped with a strong agitation mechanism, a rubber dissolved solution of the following recipe was charged:

| | Parts |
|---|---|
| Styrene | 100 |
| Polybutadiene rubber* | 7.5 |
| Benzoylperoxide | 0.2 |
| Dicumyl peroxide | 0.10 |
| Tertiary dodecylmethylcaptane | 0.03 |
| Calcium stearate | 0.1 |
| Water | 40 |

*Diene NF-35A (Trademark), manufactured by Asahi Chemical Industry Co., Ltd., Japan.

After substitution of air in the kettle with nitrogen, bulk polymerization was conducted at the number of revolutions of 300 r.p.m. at 85° C. for 3 hours. The reaction mixture obtained by this preliminary bulk polymerization was then transferred into pressure reaction vessel (250 liter volume) which was previously charged with a liquid having 4.5 parts of magnesium hydroxide dispersed and suspended in 60 parts of water. After the atmosphere of the pressure reaction vessel was substituted by nitrogen, suspension polymerization was conducted under stirring at 120 r.p.m. at 120° C. for 8 hours to complete the polymerization reaction. After cooling, hydrochloric acid was added to dissolve and remove magnesium hydroxide. Then the resulting mixture was sufficiently washed with water in a basket-type centrifugal hydroextractor, filtered and dried to obtain a beautiful and pearl-like polymer.

COMPARATIVE EXAMPLE 6

In the same recipe as described in Example 7, calcium stearate was used at all. Except for this other conditions were followed to the procedure of Example 7 to produce a polymer.

Polymer beads produced in Example 7 and Comparative Example 6 were compared and the results were as shown in the following Table 5.

TABLE 5

| | Median size from Rosin-Rammler's formula, m./m. | Appearance of particles | Amount of fine particles |
|---|---|---|---|
| Example 7 | 0.12 | Pearl-like | Substantially none. |
| Comparative example 6 | 0.85 | do | Do. |

As understood from the results of Table 5, it is noted that the polymer beads of Example 7 is controlled to a small size.

The embodiments of the invention in which an exclusive property or privilege is claimed are defined as follows:

1. A polymerization process, comprising the steps of forming a polymerizable reaction mixture containing (A) rubber elastomer dissolved or mixed in (B) aromatic monoalkenyl monomer or a mixture of aromatic monoalkenyl monomer and copolymerizable monovinyl monomer, and also containing (C) from 0.01 to 0.2 percent by weight, based on the weight of A plus B, of a particle size regulating agent selected from the group consisting of alkylene bis fatty acid amide, metallic salt of fatty acid and mixtures thereof;

then subjecting said reaction mixture to bulk polymerization until the conversion of (B) to polymer reaches 10 to 45 percent by weight;

then suspending the resulting viscous reaction mixture in water containing magnesium hydroxide as suspending agent and conducting aqueous suspension polymerization of the resulting suspension until the polymerization is substantially completed to obtain substantially spherical beads of thermoplastic polymer having a high impact strength, said beads having a controlled, relatively small average particle diameter in the range of from 0.1 to 3.0 mm. and being of larger than 200 mesh size..

2. Improved process according to Claim 1, in which said metallic salt is a metallic salt of a fatty acid selected from the group consisting of stearic acid, palmitic acid, oleic acid, ricinoleic acid and lauric acid and a metal seleted from the group consisting of calcium, magnesium, aluminum, barium, zinc, lead and cadmium.

3. A process according to Claim 1, in which the alkylene bis fatty acid amide is selected from the group consisting of methylene bis stearoamide, ethylene bis stearoamide and mixtures thereof.

4. A process according to Claim 1, in which the aromatic monoalkenyl monomer is selected from the group consisting of styrene and nuclear substituted styrenes.

5. A process according to Claim 1, in which the copolymerizable vinyl monomer is a monomer selected from the group consisting of acrylonitrile, acrylic acid esters and methacrylic acid esters.

6. A process according to Claim 1, in which the elastomer is selected from polybutadienes and butadiene-styrene rubbers.

References Cited
UNITED STATES PATENTS

| 2,801,992 | 8/1957 | Hutchinson et al. | 260—93.5 W |
| 3,649,585 | 3/1972 | Foelsch | 260—32.6 A |
| 3,660,534 | 5/1972 | Carrock | 260—880 |
| 3,696,172 | 10/1972 | Kaiho et al. | 260—880 |
| 3,712,872 | 1/1973 | Lammers et al. | 260—32.6 A |

JAMES A. SEIDLECK, Primary Examiner

U.S. Cl. X.R.

260—93.5 W